US006936574B2

(12) United States Patent
Dao et al.

(10) Patent No.: US 6,936,574 B2
(45) Date of Patent: Aug. 30, 2005

(54) PROCESS FOR CONTROLLING GAS MIGRATION DURING WELL CEMENTING

(75) Inventors: Bach Dao, Nieuw-vennep (NL); Ewout Biezen, Leiderdorp (NL); Jan Pieter Vijn, Leiderdorp (NL); Thien Pham, Zoetermeer (NL)

(73) Assignee: Halliburton Energy Services, Inc., Duncan, OK (US)

( * ) Notice: Subject to any disclaimer, the term of this patent is extended or adjusted under 35 U.S.C. 154(b) by 337 days.

(21) Appl. No.: 10/233,038

(22) Filed: Aug. 30, 2002

(65) Prior Publication Data

US 2004/0048751 A1 Mar. 11, 2004

(51) Int. Cl.$^7$ .............................. C09K 3/00; E21B 33/13

(52) U.S. Cl. ...................... 507/269; 507/239; 507/242; 507/224; 507/225; 507/903; 166/293; 166/300

(58) Field of Search ................................. 507/269, 239, 507/242, 224, 225, 903; 166/293, 300

(56) References Cited

U.S. PATENT DOCUMENTS

| | | | | |
|---|---|---|---|---|
| 4,524,828 A | | 6/1985 | Sabins et al. ............... | 166/293 |
| 4,582,139 A | * | 4/1986 | Childs et al. ............... | 166/293 |
| 4,703,801 A | * | 11/1987 | Fry et al. .................... | 166/293 |
| 5,151,203 A | | 9/1992 | Riley et al. ............... | 252/8.551 |
| 5,327,969 A | | 7/1994 | Sabins et al. ............... | 166/250 |
| 5,335,726 A | | 8/1994 | Rodrigues .................... | 166/295 |
| 5,339,903 A | * | 8/1994 | Eoff et al. ................... | 166/293 |
| 5,358,051 A | | 10/1994 | Rodrigues .................... | 166/295 |
| 5,503,227 A | | 4/1996 | Saponja et al. ............. | 166/277 |
| 5,836,392 A | | 11/1998 | Urlwin-Smith ............. | 166/295 |
| 5,945,387 A | | 8/1999 | Chatterji et al. ............ | 507/224 |
| 6,192,986 B1 | | 2/2001 | Urlwin-Smith ............. | 166/295 |
| 6,196,317 B1 | | 3/2001 | Hardy ........................ | 166/295 |

OTHER PUBLICATIONS

SPE 8257 entitled "Study Of Factors Causing Annular Gas Flow Following Primary Cementing" By John M. Tinsley et al., Sep. 1979.
Paper No. 80–31–17 entitled "Study of Annular Gas Flow Following Primary Cementing" by R. Complak et al., May 1990.
SPE 9285 entitled "Transition Time Of Cement Slurries Between The Fluid And Set State" by Fred L. Sabins et al., Sep. 1980.
Paper entitled "Annular Gas" by Fred Sabins et al., Dec. 1984.
SPE 19324 entitled Combating Gas Migration In The Michigan Basin by D.L. Bour et al., Oct. 1989.
SPE 19520 entitled "New Methods for Determining Downhole Properties That Affect Gas Migration And Annular Sealing" by D.L. Sutton et al., Oct. 1989.
SPE 22776 entitled "Low–Rate Pipe Movement During Cement Gelation To Control Gas Migration And Improve Cement Bond" by D.L. Sutton et al., Oct. 1991.
Halliburton brochure entitled "Halad®–344 Fluid–Loss Additive", dated 1998.

(Continued)

*Primary Examiner*—Philip C. Tucker
(74) *Attorney, Agent, or Firm*—Craig W. Roddy; Conley Rose P.C.

(57) ABSTRACT

The present invention provides a cement composition and a process for using the cement composition to inhibit gas migration from a subterranean zone into the cement. The process comprises displacing a gelling additive, preferably comprised within a cement composition, into a well bore such that the gelling additive passes into the subterranean zone, and allowing the gelling additive to form a crosslinked gel in the subterranean zone to inhibit gas migration from the subterranean zone. The crosslinked gel acts as a barrier to gas in the subterranean zone and thereby inhibits the gas from passing into the cement and forming flow channels therein before the cement can set.

26 Claims, 1 Drawing Sheet

Fluid Loss of H$_2$Zero System as Function of Fluid Loss Control Additive

OTHER PUBLICATIONS

Halliburton brochure entitled "H$_2$Zero™ Service Introducing the Next Generation of Cost Effective Conformance Control Solutions" dated 2002.

Halliburton brochure entitled "The PermSeal™ System Versatile, Cost–Effective Sealants For Conformance Applications", dated 2002.

* cited by examiner

PROCESS FOR CONTROLLING GAS MIGRATION DURING WELL CEMENTING

FIELD OF THE INVENTION

This invention generally relates to well cementing. More specifically, the invention relates to a cement composition having a gelling additive and a process for using the cement composition to inhibit gas migration from a subterranean formation into the cement composition during well cementing.

BACKGROUND OF THE INVENTION

Well cementing is a process used in penetrating subterranean zones (also known as subterranean formations) that produce gas. In well cementing, a well bore is drilled while a drilling fluid is circulated through the well bore. The circulation of the drilling fluid is then terminated, and a string of pipe, e.g., casing, is run in the well bore. The drilling fluid in the well bore is conditioned by circulating it downwardly through the interior of the pipe and upwardly through the annulus, which is located between the exterior of the pipe and the walls of the well bore. Next, primary cementing is typically performed whereby a slurry of cement in water is placed in the annulus and permitted to set into a hard mass to thereby attach the string of pipe to the walls of the well bore and seal the annulus.

The movement of gas from the subterranean zone into and through the cement slurry during and after primary cementing is known as gas migration. Gas migration in the annulus can cause severe problems, for example, high volume loss of gas from a high pressure zone to a low pressure zone and the failure of the cement to seal the annulus, which can undesirably lead to an uncontrollable blow-out.

Gas migration is caused by the behavior of the cement slurry during a transition phase in which the cement slurry changes from a true hydraulic fluid to a highly viscous mass showing some solid characteristics. When first placed in the annulus, the cement slurry acts as a true liquid and thus transmits hydrostatic pressure. During the transition phase, certain events occur that cause the cement slurry to lose its ability to transmit hydrostatic pressure. One of those events is the loss of fluid from the slurry to the subterranean zone. Another event is the development of static gel strength (i.e., stiffness) in the slurry. When the pressure exerted on the formation by the cement slurry falls below the pressure of the gas in the formation, the gas initially migrates into and through the cement slurry. The gas migration causes flow channels to form in the cement slurry, and those flow channels permit further migration of the gas after the cement slurry sets (i.e., hardens into a solid mass).

Various techniques have been developed for eliminating undesirable gas migration. For example, U.S. Pat. No. 5,327,969 discloses a method in which the initial surface pressure in the pipe is determined after the cement slurry is placed in the annulus, followed by displacing additional cement slurry into the annulus as is necessary to maintain the pipe surface pressure substantially equal to the initial surface pressure in the pipe; U.S. Pat. No. 5,339,903 discloses a method in which a compound consisting of a tannin backbone having polymers grafted thereto is added to a slurry of cement in water to reduce fluid loss from and to modify the gel strength of the slurry; and U.S. Pat. No. 5,503,227 discloses a method in which one or more lateral openings are formed through the casing and the cement sheath into the subterranean formation, one or more horizontal fractures are created in the formation extending from the lateral openings, and a fluid that sets into a substantially gas impermeable solid is deposited in the openings and fractures, thereby plugging passages in the cement sheath and terminating gas migration.

Unfortunately, conventional attempts to prevent gas migration during primary well cementing have been unreliable, difficult to carry out, and/or very expensive. As such, there continues to be a need for improved methods for eliminating gas migration during well cementing. The present invention utilizes a relatively inexpensive and simple method to inhibit gas migration.

SUMMARY OF THE INVENTION

The present invention includes a cement composition that inhibits migration of gas from a subterranean zone during well cementing. The cement composition comprises a cement and a gelling additive capable of passing into the subterranean zone when the cement composition is displaced into a well bore. The gelling additive is further capable of forming a crosslinked gel in the subterranean zone to inhibit gas migration from the subterranean zone into the cement. The cement composition may also include a fluid loss control additive for inhibiting water from exiting the cement composition.

According to one embodiment of the invention, the gelling additive preferably is a copolymer of at least one non-acidic ethylenically unsaturated polar monomer and at least one ethylenically unsaturated ester, and more preferably is a copolymer of acrylamide and t-butyl acrylate. According to another embodiment of the invention, the gelling additive preferably is a self-crosslinking monomer comprising at least one water soluble hydroxy unsaturated carbonyl, and more preferably is hydroxyethylacrylate. The cement composition may also comprise an organic gelling agent capable of crosslinking the gelling additive and/or an azo compound initiator capable of initiating polymerization of the monomer.

The present invention further includes a process for using the above-described cement composition to inhibit gas migration from a subterranean zone into the cement. The process comprises displacing a cement composition comprising a cement and a gelling additive into a well bore such that the gelling additive passes into the subterranean zone, and allowing the gelling additive to form a crosslinked gel in the subterranean zone to inhibit gas migration from the subterranean zone. The cement composition undergoes fluid loss when the gelling additive passes from the cement composition in the well bore into the subterranean zone, and preferably such fluid loss is controlled to maintain the cement composition at a hydrostatic pressure about equal to or greater than the pressure in the subterranean zone for a sufficient amount of time to allow the gelling agent in the subterranean zone to form a crosslinked gel. The crosslinked gel acts as a barrier to gas in the subterranean zone and thereby inhibits the gas from passing into the cement and forming flow channels therein before the cement can set.

DESCRIPTION OF THE DRAWINGS

The invention, together with further advantages thereof, may best be understood by reference to the following description taken in conjunction with the accompanying drawing in which.

DETAILED DESCRIPTION OF THE PREFERRED EMBODIMENTS

Figure 1:
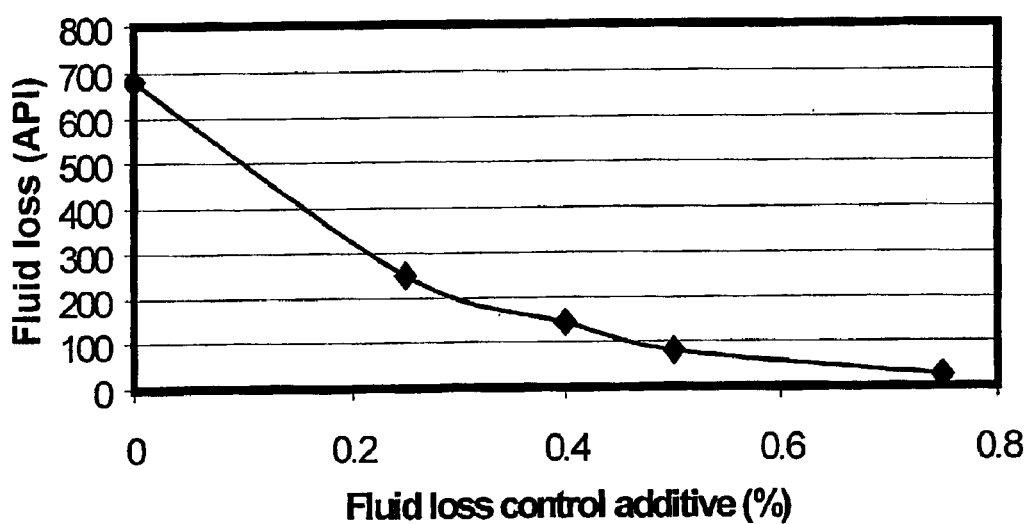
FIG. 1 is a graph depicting the fluid loss of a gelling additive from a cement composition as a function of the concentration of a fluid loss control additive in the cement composition.

In a preferred embodiment of the invention, a well cementing process is performed using a cement composition that inhibits gas migration from a subterranean zone into the cement. The well cementing process is carried out according to standard well cementing practices and includes drilling a well bore down to the subterranean zone while circulating a drilling fluid through the well bore. A string of pipe, e.g., casing, is then run in the well bore. The drilling fluid is conditioned by circulating it downwardly through the interior of the pipe and upwardly through the annulus, which is located between the exterior of the pipe and the walls of the well bore. The cement composition of the present invention is displaced down through the pipe and up through the annulus. In addition to comprising cement, the cement composition also comprises a gelling additive that flows into and fills the porous medium of the subterranean zone, which may be composed of acidic rock, e.g., sandstone or limestone.

A gelling additive is herein defined as a viscous fluid that will flow under stress and that is capable of being converted to a gel. The gelling additive preferably has a tendency to undergo crosslinking and gelling at the relatively low up to high temperatures of the subterranean zone. As such, the gelling additive forms a crosslinked gel in the subterranean zone, thus plugging openings in the porous medium of the subterranean zone. A gel is herein defined as a crosslinked polymer network swollen in a liquid. The method by which the gelling additive becomes crosslinked depends on the composition of the gelling additive, which is described later in detail. The gelling additive (and gelling agent, when present) migrates from the cement composition into the surrounding subterranean zone, typically by way of diffusion based upon a formation gradient. The presence of the gel in the subterranean zone blocks gas and water from exiting the zone and entering the cement during the cement's transformation into a solid mass (i.e., set-up). That is, the molecules of the gel are sufficiently packed together to substantially inhibit gas and water from passing through the gel. Preferred gelling additives are those capable of forming such gels that inhibit the flow of gas and/or water under conditions present (e.g., temperatures and pressures) in the subterranean zone.

The amount of time required for the gelling additive to undergo crosslinking to form a gel (i.e., the gelation time) varies depending on the temperature in the subterranean zone and the concentration and composition of the gelling additive. The temperature of the subterranean zone is typically about 20° C. to about 180° C., particularly about 100° C. to about 150° C. Under these conditions, the preferred gelation time ranges from about 30 minutes to about 8 hours, preferably from about 30 minutes to about 60 minutes.

Any known cement may be utilized in the cement composition, including hydraulic cements composed of calcium, aluminum, silicon, oxygen, and/or sulfur which set and harden by reaction with water. Examples of suitable hydraulic cements are Portland cements, pozzolana cements, gypsum cements, high alumina content cements, silica cements, and high alkalinity cements. Classes A, B, C, G, and H Portland cements are preferred, classes G and H Portland cements are more preferred, and class G Portland cement is the most preferred. A Class G Portland cement particularly suitable for use in the cement composition of the present invention is available from Dyckerhoff AG located in Germany.

Any suitable gelling additive capable of flowing into a subterranean zone and forming a crosslinked gel capable of inhibiting the flow of gas and/or water within the zone may be combined with the cement. In a preferred embodiment, the gelling additive is a copolymer of at least one ethylenically unsaturated ester and at least one non-acidic ethylenically unsaturated polar monomer. The copolymer preferably contains from one to three polar monomers and from one to three unsaturated esters. An aqueous solution of the copolymer and an organic gelling agent for crosslinking the copolymer is preferably mixed with the cement. The amount of copolymer present in the aqueous solution is preferably about 400 to about 100,000 ppm, more preferably about 500 to about 10,000 ppm for copolymers having a molecular weight of at least 1 million, and more preferably about 10,000 to about 100,000 ppm for copolymers having a molecular weight of 50,000 to 1 million. The amount of gelling agent in the aqueous solution is preferably about 10 to about 50,000 ppm, more preferably about 10 to about 1,000 ppm and about 1,000 to about 50,000 ppm respectively, for the high and low molecular weight copolymers. A preferred aqueous solution of copolymer and gelling agent for use in the cement composition hereof is commercially available from Halliburton Energy Services, Inc. under the tradename $H_2Zero$. The concentration of the aqueous solution in the cement composition preferably ranges from about 0.3 to about 10% by weight of the total cement composition, more preferably from about 2 to about 8%, and most preferably from about 5 to about 7%.

The ethylenically unsaturated esters used in the copolymer may be formed from a hydroxyl compound and an ethylenically unsaturated carboxylic acid selected from the group consisting of acrylic, methacrylic, crotonic, and cinnamic acids. The ethylenically unsaturated group is preferably in the alpha-beta or beta-gamma position relative to the carboxyl group, but it may be at a further distance. Preferably, the hydroxyl compound is an alcohol generally represented by the formula ROH, wherein R is an alkyl, alkenyl, cycloalkyl, aryl, arylalkyl, aromatic, or heterocyclic group that may be substituted with one or more of a hydroxyl, ether, and thioether group. The substituent is preferably on the same carbon atom of the R group as is bonded to the hydroxyl group in the hydroxyl compound. The hydroxyl compound may be a primary, secondary, iso, or tertiary compound. Preferably, a tertiary carbon atom is bonded to the hydroxyl group, e.g., t-butyl and trityl. The most preferred ethylenically unsaturated ester is t-butyl acrylate.

The non-acidic ethylenically unsaturated polar monomers used in the copolymer are preferably amides, e.g., primary, secondary, and/or tertiary amides, of an unsaturated carboxylic acid. Such amides may be derived from ammonia, or a primary or secondary alkylamine, which may be optionally substituted by at least one hydroxyl group as in alkylol amides such as ethanolamides. Examples of such carboxylic derived polar monomers are acrylamide, methacrylamide, and acrylic ethanol amide, with acrylamide being the preferred ethylenically unsaturated polar monomer.

The copolymer may be formed using any known method for copolymerizing ethylenically unsaturated monomers. The copolymer preferably contains about 0.01 to about 50 mol %, more preferably about 1 to about 30 mol %, and most preferably about 5 to about 15 mol %, of structural units from the ester(s). The copolymer also preferably contains about 50 to about 99.9 mol %, more preferably about 70 to about 99 mol %, and most preferably about 85 to about 95 mol %, of structural units from the polar monomer(s). The copolymer may be soluble in water to an extent of at least about 1 g/L, and preferably to an extent of about 1 to about 200 g/L, for example at least about 10 g/L in distilled water at 15° C.

Any suitable organic gelling agent for crosslinking the copolymer gelling additive may be combined with the copolymer. The gelling agent is preferably a water-soluble polymer selected from the group consisting of a polyalkyleneimine, a polyfunctional aliphatic amine, an aralkylamine, a heteroaralkylamine, and combinations thereof. Preferred polymers for use as gelling agents include polyalkyleneimines, polyalkylenepolyamines, which are polyfunctional aliphatic amines, and combinations thereof. Examples of suitable polyalkyleneimines are polymerized ethyleneimine and propyleneimine. Examples of suitable polyalkylenepolyamines are polyethylene- and polypropylene-polyamines.

Additional disclosure regarding suitable copolymers and gelling agents for use in the cement composition hereof can be found in U.S. Pat. No. 5,836,392; U.S. Pat. No. 6,192,986; and U.S. Pat. No. 6,196,317, which are incorporated herein in their entirety.

According to another embodiment of the invention, the gelling additive is a self-crosslinking polymerizable monomer comprising at least one water soluble, hydroxy unsaturated carbonyl. The carbonyl is preferably present in an aqueous solution in an amount of about 5 to about 20 pounds per 100 pounds of solution, more preferably about 10 to about 15 pounds per 100 pounds of solution, and most preferably about 2 pounds per 100 pounds of solution. A polymerization initiator, i.e., catalyst, is combined with the aqueous solution containing the carbonyl for initiating polymerization of the monomer.

Suitable hydroxy unsaturated carbonyls can form a gel in the absence of a gelling/crosslinking agent and are generally represented by the formula:

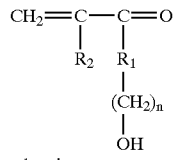

wherein

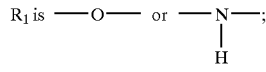

$R_2$ is hydrogen or —$CH_3$, and n is 1 or 2. The hydroxyl unsaturated carbonyl may be a compound selected from the group consisting of hydroxyethylacrylate, N-hydroxymethylacrylamide, N-hydroxymethyl methacrylamide, hydroxyethylmethacrylate, hydroxymethylacrylate, hydroxymethylmethacrylate, N-hydroxyethylacrylamide, and N-hydroxyethylmethacrylamide.

A polymerization initiator may be any suitable water-soluble compound that forms free radicals in aqueous solution. The polymerization initiator is preferably an azo compound generally represented by the formula:

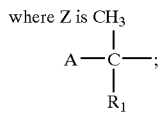

where Z is $CH_3$

B is Z or $R_2$;
$R_1$ is —$CH_3$ or —C≡N;

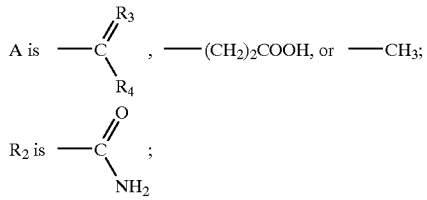

$R_3$ is =N—, =NH, or =O; and

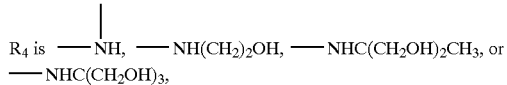

where $R_4$ is —NH when $R_3$ is =N—, and where $R_1$ is —C≡N and A is —$CH_3$ when B is $R_2$.

The most preferred azo compounds are 2,2'-Azobis(N,N'-dimethylene isobutyramidine)dihydrochloride, 2,2'-Azobis(2-amidinopropane)dihydrochloride, and 2,2'-Azobis[2-methyl-N-(2-hydroxethyl)propionamide]. The azo initiator is combined with the aqueous solution containing the monomer and is preferably present in the solution in an amount of about 0.001 to about 2.0, more preferably about 0.01 to about 1.0, and most preferably about 0.05 to about 0.5, percent by weight of the monomer solution. A preferred solution of monomer and initiator for use in the cement composition hereof is commercially available from Halliburton Energy Services, Inc. under the tradename Permseal. The concentration of the solution in the cement composition preferably ranges from about 0.3 to about 10% by weight of the total cement composition, more preferably from about 2 to about 8%, and most preferably from about 5 to about 7%.

Additional disclosure regarding suitable monomers and polymerization initiators for use in the cement composition hereof can be found in U.S. Pat. Nos. 5,335,726 and 5,358,051, which are incorporated herein in their entirety.

The cement composition may further include any suitable fluid loss control additive for controlling the amount of fluid passing from the cement composition into the subterranean zone (i.e., fluid loss). This fluid includes both the water and the gelling additive present in the cement composition. The fluid loss can be controlled to maintain the cement composition at its hydrostatic pressure for a sufficient amount of time to allow the gelling agent in the subterranean zone to form a crosslinked gel (i.e., Zero gel time). This hydrostatic pressure is preferably higher than the pressure of the subterranean zone such that gas and/or other fluids such are water or liquid hydrocarbons are substantially prevented from passing into the cement composition during this period. The fluid loss also can be controlled to maintain the cement/water ratio in the cement composition that is necessary for the cement to react and set properly.

A preferred fluid loss control additive is disclosed in U.S. Pat. No. 4,703,801, incorporated herein by reference in its entirety. Another preferred fluid loss control additive is commercially available from Halliburton Energy Services, Inc. of Duncan, Oklahoma under the tradenames Halad-344 or Halad-600LE+. Other suitable fluid loss control additives are known in the art and include cellulose derivatives such as carboxymethylhydroxyethyl cellulose, hydroxyethyl cellulose, modified polysaccharides, polyacrylamides, polyaromatic sulfonates, guar gum derivatives, and mixtures thereof.

The cement composition may further include additional additives as deemed appropriate by one skilled in the art. For example, the cement composition may include any suitable set retarder for extending or retarding the setting time of the cement slurry to ensure that there is adequate pumping time in which to place the slurry in desired locations. Examples of suitable retarders include lignosulfonates, such as calcium lignosulfonate and sodium lignosulfonate, organic acids, such as tartaric acid, gluconic acid, polysuccimide, polyaspartic acid, and mixtures thereof. The cement composition may also include dispersing agents to facilitate using lower quantities of water and to promote higher set cement strength. The cement composition may be mixed in accordance with standard industry practices, preferably with a desired concentration of gelling additive in aqueous solution (e.g., $H_2$Zero system) admixed to fresh or sea water, followed by admix of cement additives, followed by admix of cement.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

All experimental examples were conducted according to the American Petroleum Institute (API) Specification 10, $5^{th}$ Edition, Jul. 1, 1990. Five different cement compositions containing different amounts of Halad-344 fluid loss control additive were formed and tested at the same specific gravity (SG) to determine the effect the amount of fluid loss control additive on the cement composition. Table 1 below shows the results of these tests.

TABLE 1

| | Sample 1 | Sample 2 | Sample 3 | Sample 4 | Sample 5 |
|---|---|---|---|---|---|
| Component | | | | | |
| $H_2$Zero system | 50 | 50 | 50 | 50 | 50 |
| Dyckerhoff G cement | 100 | 100 | 100 | 100 | 100 |
| Halad-344 additive | — | 0.25 | 0.4 | 0.5 | 0.75 |
| (Each in wt. %) | | | | | |
| Density (SG) | 1.85 | 1.85 | 1.85 | 1.85 | 1.85 |
| Bottomhole Static Temperature (° F.) | 86 | 86 | 86 | 86 | 86 |
| Rheology After Mix | | | | | |
| 300-200-100 | 300+-220-136 | +300-228-128 | 300+-210-166 | +300-298-154 | 300+-300+-240 |
| 6-3 | 39-35 | 21-18 | 18-12 | 19-13 | 24-14 |
| Fluid Loss at 86° F., 1000 psi with a 325 mesh screen (cc API) | 680 | 250 | 143 | 80 | 24 |
| Captured Filtrate in Water Bath at 86° C. | gelled | gelled | gelled | gelled | gelled |
| UCA analyzer at 86° F. | | | | | |
| 50 psi (hrs:min) | ND | 7:59 | 8:19 | 7:09 | 30:13 |
| 500 psi (hrs:min) | | 15:39 | 16:13 | 12:32 | 87:13 |
| 24 hrs. (hrs:min) | | 1220 | 1070 | 2000 | 0 |
| Final Compressive Strength (psi/hrs) | | 2854/91 | 2487/71 | 4163/90 | 1225/90 |

As shown in Table 1, the $H_2$Zero system from all of the samples 1–5 formed a gel in a water bath at 86° C. The compressive strength of each cement composition over time was determined using a UCA analyzer set at 86° F. The compressive strengths increased significantly over time, and thereby formed cement structures having relatively high compressive strengths. FIG. 1 depicts a graph of the fluid loss of $H_2$Zero system as a function of the concentration of fluid loss control additive, Halad-344, in the cement composition. The fluid loss decreased from 680 to 24 as the concentration of Halad-344 additive increased from zero to 0.75 wt. % Halad-344 additive based on the total cement composition.

Two additional cement compositions containing the same amounts of the fluid loss control additive were formed and tested at a different specific gravities (SG) to determine the effect of the specific gravity, i.e., density, on the fluid loss. These tests are shown below in Table 2.

TABLE 2

| | Sample 6 | Sample 7 |
|---|---|---|
| Component | | |
| $H_2$Zero system (wt. %) | 50 | 50 |
| Dyckerhoff G cement (wt. %) | 100 | 100 |
| Halad-344 additive (wt. %) | 0.5 | 0.5 |
| Density (SG) | 1.80 | 1.85 |
| Bottomhole Static Temperature (° F.) | 86 | 86 |
| Rheology After Mix | | |
| 300-200-100 | 300+-206-106 | 300+-298-154 |
| 6-3 | 13-10 | 19-13 |
| Fluid Loss at 86° F., 1000 psi with a 325 mesh screen (cc API) | 38 | 80 |
| Captured Filtrate in Water Bath at 86° C. | gelled | gelled |

TABLE 2-continued

|  | Sample 6 | Sample 7 |
|---|---|---|
| UCA analyzer at 86° F. | | |
| 50 psi (hrs:min) | 8:40 | 7:04 |
| 500 psi (hrs:min) | 17:07 | 12:32 |
| 24 hrs. (hrs:min) | 960 | 2000 |
| Final Compressive Strength | 2095 | 4163 |

As shown in Table 2, the $H_2$Zero system from samples 6–7 formed a gel in a water bath at 86° C. The compressive strengths of the samples increased significantly over time and thus formed cement structures having relatively high compressive strengths. Further, the $H_2$Zero system fluid loss from the slurry increased from 38 to 80 as the density of the cement composition increased from 1.80 to 1.85. Therefore, reducing the viscosity of the cement slurry increased the amount of fluid loss.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

What is claimed is:

1. A process for inhibiting gas migration from a subterranean zone into a well bore cement, comprising:
   (a) displacing a cement composition comprising a cement and a gelling additive into a well bore such that the gelling additive migrates from the cement composition into the surrounding subterranean zone and then forms a barrier; and
   (b) allowing the gelling additive to form a crosslinked gel in the subterranean zone to inhibit gas migration from the subterranean zone into the cement.

2. A process for inhibiting gas migration from a subterranean zone into a well bore cement, comprising:
   (a) displacing a cement composition comprising a cement and a gelling additive into a well bore such that the gelling additive passes into the subterranean zone; and
   (b) allowing the gelling additive to form a crosslinked gel in the subterranean zone to inhibit gas migration from the subterranean zone into the cement,
   wherein the cement composition further comprises an organic gelling agent capable of crosslinking the gelling additive and wherein the gelling agent is selected from the group consisting of a polyalkyleneimine, a polyfunctional aliphatic amine, an aralkylamine, a heteroaralkylamine, and combinations thereof, and wherein the gelling additive is a copolymer of at least one non-acidic ethylenically unsaturated polar monomer and at least one ethylenically unsaturated ester.

3. The process of claim 2, wherein the concentration of the gelling additive in the cement composition ranges from about 0.3 to about 10% by weight of the total cement composition.

4. The process of claim 3 further comprising controlling fluid loss from the cement composition to maintain the cement composition at a hydrostatic pressure about equal to or greater than the pressure in the subterranean zone for a sufficient amount of time to allow the gelling additive in the subterranean zone to form a crosslinked gel.

5. The process of claim 4 further comprising controlling the cement to water ratio in the cement composition as required for the cement to react and set.

6. The process of claim 2 wherein the polyfunctional aliphatic amine is a polyalkylenepolyamine.

7. The process of claim 6 wherein the polyalkylenepolyamine is a polyethylene- or polypropylene-polyamine.

8. The process of claim 2 wherein the polyalkyleneimine is a polymerized ethyleneimine propyleneimine.

9. The process of claim 2 wherein the copolymer comprises from one to three polar monomers and from one to three unsaturated esters.

10. The process of claim 2 wherein the ethylenically unsaturated ester is formed from a hydroxyl compound and an ethylenically unsaturated carboxylic acid selected from the group consisting of acrylic, methacrylic, crotonic, and cinnamic acids.

11. The process of claim 10 wherein the hydroxyl compound is an alcohol generally represented by the formula ROH, wherein R is an alkyl, alkenyl, cycloalkyl, aryl, arylalkyl, or an aromatic or heterocyclic group substituted with one or more of a hydroxyl, ether, and thioether group.

12. The process of claim 2 wherein the ethylenically unsaturated ester is t-butyl acrylate.

13. The process of claim 2 wherein the ethylenically unsaturated polar monomer is an amide of an unsaturated carboxylic acid.

14. The process of claim 2 wherein the ethylenically unsaturated polar monomer is acrylamide.

15. The process of claim 12 wherein the ethylenically unsaturated polar monomer is acrylamide.

16. The process of claim 2 wherein the gelling agent and the copolymer are in aqueous solution.

17. A process for inhibiting gas migration from a subterranean zone into a well bore cement, comprising:
   (a) displacing a cement composition comprising a cement and a gelling additive into a well bore such that the gelling additive passes into the subterranean zone; and
   (b) allowing the gelling additive to form a crosslinked gel in the subterranean zone to inhibit gas migration from the subterranean zone into the cement, wherein the gelling additive is a polymerizable monomer comprising at least one water soluble hydroxy unsaturated carbonyl.

18. The process of claim 17 wherein the hydroxy unsaturated carbonyl is a self-crosslinking monomer generally represented by the formula;

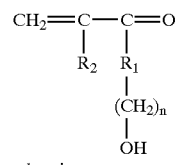

wherein $R_1$ is —O— or —N—;
                    |
                    H $R_2$ is hydrogen or —$CH_3$, and n is 1 or 2.

19. The process of claim 17 wherein the hydroxyl unsaturated carbonyl is a compound selected from the group consisting of hydroxyethylacrylate, N-hydroxymethylacrylamide, N-hydroxymethyl methacrylamide, hydroxyethylmethacrylate, hydroxymethylacrylate, hydroxymethylmethacrylate, N-hydroxyethylacrylamide, and N-hydroxyethylmethacrylamide.

20. The process of claim 17 further comprising an azo initiator capable of initiating polymerization of the monomer.

21. The process of claim 20 wherein the azo initiator is generally represented by the formula:

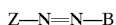

where Z is

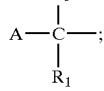

B is Z or $R_2$;
$R_1$ is —$CH_3$ or C≡N;

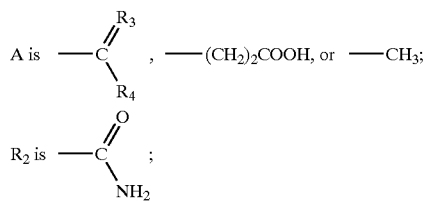

$R_3$ is =N=, =NH, or =O; and

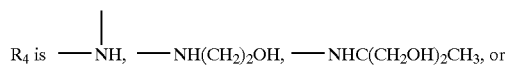

-continued

—NHC($CH_2OH$)$_3$,

wherein $R_4$ is —NH when $R_3$ is =N—, and wherein $R_1$ is —C≡N and A is —$CH_3$ when B is $R_2$.

22. The process of claim 20 wherein the azo initiator is a compound selected from the group consisting of 2,2'-Azobis (N,N'-dimethylene isobutyramidine)dihydrochloride, 2,2'-Azobis(2-amidinopropane)dihydrochloride, and 2,2'-Azobis[2-methyl-N-(2-hydroxethyl) propionamide].

23. The process of claim 19 further comprising an azo initiator selected from the group consisting of 2,2'-Azobis (N,N'-dimethylene isobutyramidine)dihydrochloride, 2,2'-Azobis (2-amidinopropane)dihydrochloride, and 2,2'-Azobis[2-methyl-N-(2-hydroxethyl) propionamide].

24. The process of claim 20 wherein the polymerizable monomer and the azo initiator are in aqueous solution.

25. The process of claim 2 wherein the cement composition further comprises a fluid loss control additive for inhibiting water from exiting the cement composition.

26. A process for inhibiting gas migration from a subterranean zone into a well bore cement, comprising displacing a gelling additive into a well bore such that the gelling additive migrates from the cement composition into the surrounding subterranean zone and then forms a barrier; and allowing the gelling additive to form a crosslinked gel in the subterranean zone to inhibit gas migration from the subterranean zone into the cement.

* * * * *